(12) United States Patent
Ehde

(10) Patent No.: US 8,397,341 B2
(45) Date of Patent: Mar. 19, 2013

(54) BEAM BLADE WINDSHIELD WIPER ASSEMBLY

(75) Inventor: Dan Ehde, Ortonville, MI (US)

(73) Assignee: Trico Products Corporation, Rochester Hills, MI (US)

(*) Notice: Subject to any disclaimer, the term of this patent is extended or adjusted under 35 U.S.C. 154(b) by 419 days.

(21) Appl. No.: 12/779,290

(22) Filed: May 13, 2010

(65) Prior Publication Data

US 2011/0277265 A1 Nov. 17, 2011

(51) Int. Cl.
*A47L 1/00* (2006.01)
*B60S 1/02* (2006.01)

(52) U.S. Cl. .................. 15/250.32; 15/43; 15/351

(58) Field of Classification Search ............... 15/250.31, 15/250.32, 250.43, 250.44, 250.201, 250.35, 15/250.361
See application file for complete search history.

(56) References Cited

U.S. PATENT DOCUMENTS

| | | | |
|---|---|---|---|
| 2,589,339 A | 3/1952 | Carson |
| 2,616,112 A | 11/1952 | Smulski |
| 2,643,411 A | 6/1953 | Nesson |
| 2,799,887 A | 7/1957 | Nemic |
| 2,801,436 A | 8/1957 | Scinta |
| 2,814,820 A | 12/1957 | Elliott et al. |
| 2,932,843 A | 4/1960 | Zaiger et al. |
| 2,937,393 A | 5/1960 | Brueder |
| 2,946,078 A | 7/1960 | Deibel et al. |
| 2,974,341 A | 3/1961 | Hart |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,147,507 A | 9/1964 | Glynn |
| 3,179,969 A | 4/1965 | Glynn |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| 3,378,874 A | 4/1968 | Scinta |
| D211,570 S | 7/1968 | Tomlin |
| 3,418,679 A | 12/1968 | Barth et al. |
| 3,480,986 A | 12/1969 | Forster |
| 3,588,942 A | 6/1971 | Schlesinger |
| 3,618,155 A | 11/1971 | Mower |
| 3,641,614 A | 2/1972 | Newsome |

(Continued)

FOREIGN PATENT DOCUMENTS

DE 1028896 4/1958
DE 1247161 8/1967

(Continued)

*Primary Examiner* — William Gilbert
(74) *Attorney, Agent, or Firm* — Bliss McGlynn, P.C.

(57) ABSTRACT

The present invention relates to a wiper blade system that includes a wiper blade assembly having a wiping element, at least one elongated beam and a carrier that is operatively engaged to the elongated beam. The wiper blade assembly further includes an airfoil and a coupler that is removably engaged to the carrier and adapted to releasably attach the wiper blade assembly to a wiper arm attachment member. The coupler is universal in that it is used for connecting the wiper blade assembly to various styles of wiper arms.

6 Claims, 8 Drawing Sheets

U.S. PATENT DOCUMENTS

| | | |
|---|---|---|
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,780,395 A | 12/1973 | Quinlan et al. |
| 3,845,519 A | 11/1974 | Quinlan et al. |
| 3,862,465 A | 1/1975 | Ito |
| 3,872,537 A | 3/1975 | Biachi |
| 3,879,793 A | 4/1975 | Schlegel |
| 3,881,214 A | 5/1975 | Palu |
| 4,028,770 A | 6/1977 | Appel |
| 4,063,328 A | 12/1977 | Arman |
| 4,083,642 A | 4/1978 | Journee |
| 4,102,003 A | 7/1978 | Hancu |
| 4,127,916 A | 12/1978 | van den Berg et al. |
| 4,132,490 A | 1/1979 | Journee |
| 4,158,513 A | 6/1979 | Journee |
| 4,224,001 A | 9/1980 | Arndt et al. |
| 4,300,259 A | 11/1981 | Maiocco |
| 4,309,790 A | 1/1982 | Bauer et al. |
| 4,339,839 A | 7/1982 | Knights |
| 4,343,063 A | 8/1982 | Batt |
| D267,939 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| 4,741,071 A | 5/1988 | Bauer et al. |
| 4,766,636 A | 8/1988 | Shinpo |
| 4,782,547 A | 11/1988 | Mohnach |
| 4,807,326 A | 2/1989 | Arai et al. |
| 4,852,206 A | 8/1989 | Fisher |
| D307,408 S | 4/1990 | Mower et al. |
| D308,660 S | 6/1990 | Fisher |
| D308,845 S | 6/1990 | Charet et al. |
| 4,976,001 A | 12/1990 | Wright |
| 4,980,944 A | 1/1991 | Longman |
| 4,984,325 A | 1/1991 | Arai et al. |
| 4,989,290 A | 2/1991 | Hoshino |
| 5,042,106 A | 8/1991 | Maubray |
| 5,056,183 A | 10/1991 | Haney, III |
| 5,062,176 A | 11/1991 | Unterborn et al. |
| 5,084,933 A | 2/1992 | Buechele |
| 5,086,534 A | 2/1992 | Journee |
| 5,093,954 A | 3/1992 | Kuzuno |
| 5,123,140 A | 6/1992 | Raymond |
| 5,138,739 A | 8/1992 | Maubray |
| 5,168,596 A | 12/1992 | Maubray |
| 5,168,597 A | 12/1992 | Schoen et al. |
| 5,170,527 A | 12/1992 | Lyon, II |
| 5,179,761 A | 1/1993 | Buechele et al. |
| 5,206,969 A | 5/1993 | Patterson et al. |
| 5,218,735 A | 6/1993 | Maubray |
| 5,228,167 A | 7/1993 | Yang |
| 5,233,721 A | 8/1993 | Yang |
| 5,257,436 A | 11/1993 | Yang |
| 5,276,937 A | 1/1994 | Lan |
| 5,283,925 A | 2/1994 | Maubray |
| 5,307,536 A | 5/1994 | Lescher |
| 5,311,636 A | 5/1994 | Lee |
| 5,319,826 A | 6/1994 | Mower |
| 5,325,564 A | 7/1994 | Swanepoel |
| 5,332,328 A | 7/1994 | Yang |
| 5,383,249 A | 1/1995 | Yang |
| 5,392,487 A | 2/1995 | Yang |
| 5,392,489 A | 2/1995 | Mohnach |
| 5,454,135 A | 10/1995 | Okuya et al. |
| 5,463,790 A | 11/1995 | Chiou et al. |
| 5,485,650 A | 1/1996 | Swanepoel |
| 5,509,166 A | 4/1996 | Wagner et al. |
| 5,553,962 A | 9/1996 | Eustache |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,724,700 A | 3/1998 | Marks |
| 5,807,016 A | 9/1998 | Herring et al. |
| 5,885,023 A | 3/1999 | Witek et al. |
| 5,937,474 A | 8/1999 | Hussaini |
| 5,946,764 A | 9/1999 | Tworzydlo |
| 6,000,093 A | 12/1999 | Charng |
| 6,158,078 A | 12/2000 | Kotlarski |
| 6,161,249 A | 12/2000 | Hussaini |
| 6,279,191 B1 | 8/2001 | Kotlarski et al. |
| 6,292,974 B1 | 9/2001 | Merkel et al. |
| 6,332,236 B1 | 12/2001 | Ku |
| 6,353,962 B1 | 3/2002 | Matsumoto et al. |
| 6,434,780 B1 | 8/2002 | Kotlarski |
| 6,523,218 B1 | 2/2003 | Kotlarski |
| 6,550,096 B1 | 4/2003 | Stewart et al. |
| 6,553,607 B1 | 4/2003 | De Block |
| 6,581,237 B1 | 6/2003 | Kotlarski |
| 6,591,445 B2 | 7/2003 | Nacamuli |
| 6,599,051 B1 | 7/2003 | Jarasson |
| 6,611,988 B1 | 9/2003 | De Block |
| 6,625,842 B1 | 9/2003 | De Block |
| 6,634,056 B1 | 10/2003 | De Block |
| 6,654,983 B1 | 12/2003 | Raynaud |
| 6,665,905 B2 | 12/2003 | Wegner et al. |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,836,924 B2 | 1/2005 | Egan-Walter |
| 6,836,926 B1 | 1/2005 | De Block |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 | 6/2006 | Coughlin |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wilms et al. |
| 7,451,520 B2 | 11/2008 | Weiler et al. |
| 7,546,660 B2 | 6/2009 | Heinrich et al. |
| 7,581,279 B2 | 9/2009 | Baseotto et al. |
| 7,621,016 B2 | 11/2009 | Verelst et al. |
| 2006/0130263 A1 | 6/2006 | Coughlin |
| 2007/0174989 A1 | 8/2007 | Moll et al. |
| 2009/0199357 A1 | 8/2009 | Thienard |

FOREIGN PATENT DOCUMENTS

| | | |
|---|---|---|
| DE | 1505397 | 10/1969 |
| DE | 1655410 | 8/1971 |
| DE | 2311293 | 9/1974 |
| DE | 2336271 | 2/1975 |
| DE | 2350302 | 4/1975 |
| DE | 2353368 | 5/1975 |
| DE | 2640399 | 3/1977 |
| DE | 19729865 A1 | 1/1999 |
| DE | 19734843 A1 | 2/1999 |
| DE | 19814609 A1 | 10/1999 |
| DE | 10335393 A1 | 9/2004 |
| EP | 0594451 A1 | 4/1994 |
| FR | 1069875 | 2/1954 |
| FR | 2377302 | 8/1978 |
| FR | 2515121 | 4/1983 |
| GB | 878951 | 10/1961 |
| GB | 1012902 | 12/1965 |
| GB | 1395918 | 5/1975 |
| GB | 2308542 A | 7/1997 |
| JP | 2007-331748 A | 12/2007 |
| WO | 0021809 | 4/2000 |

| | | | | | | |
|---|---|---|---|---|---|---|
| WO | 02087935 | A1 | 11/2002 | WO | 2004076251 A1 | 9/2004 |
| WO | 03051696 | A1 | 6/2003 | WO | 2004076252 A1 | 9/2004 |
| WO | 03080409 | A1 | 10/2003 | WO | 2006069648 A1 | 7/2006 |
| WO | 2004048163 | A1 | 6/2004 | WO | 2009133979 A1 | 11/2009 |

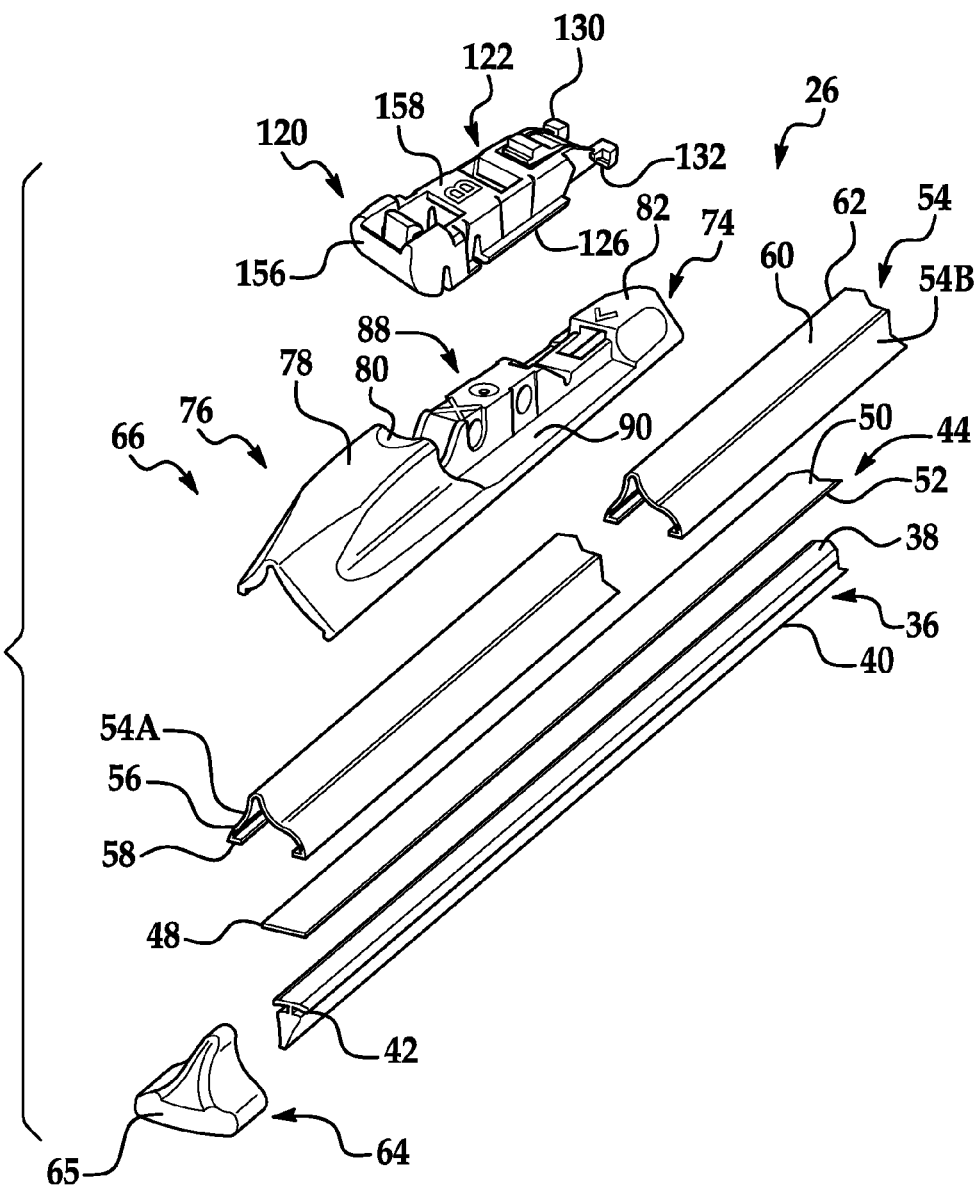
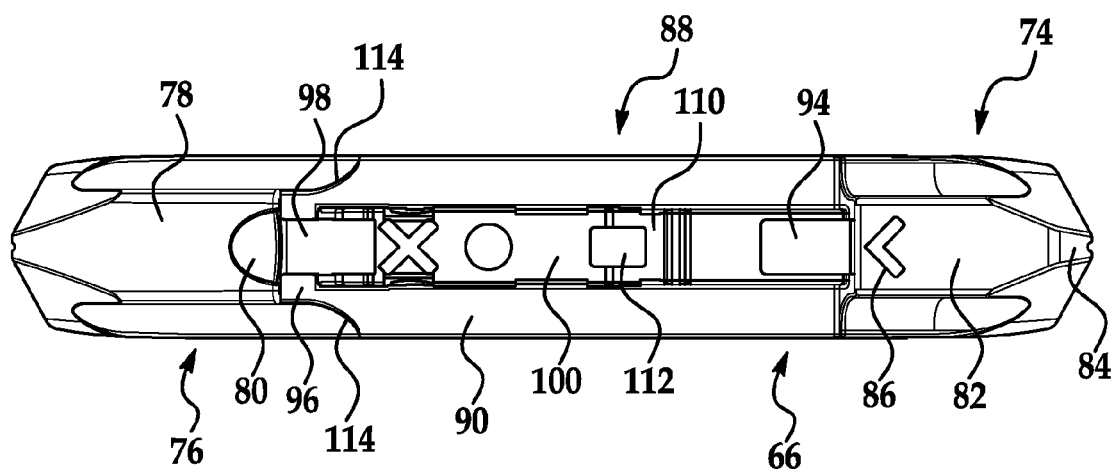

BEAM BLADE WINDSHIELD WIPER ASSEMBLY

BACKGROUND OF THE INVENTION

1. Field of the Invention

The present invention relates, generally, to windshield wiper assemblies. More specifically, the present invention relates to a beam blade windshield wiper assembly having a universal coupler subassembly for use in connecting a beam blade wiper to various styles of wiper arms.

2. Description of the Related Art

Windshield wipers known in the related art include two categories commonly referred to as, "tournament" wipers and "beam blade" style wipers. In either category, the windshield wiper assembly is removably connected to the wiper arm of a vehicle. Specifically, a wiper coupler is employed to facilitate the connection between the windshield wiper assembly and the attachment member of the wiper arm.

At the manufacturing level, there is usually not much concern over compatibility between the wiper assemblies and the wiper arm since these components are typically supplied to OEM vehicle manufacturers as a part of an overall wiper system. However, windshield wiper assemblies wear out and must be replaced. Typically, the wiper coupler for a beam blade windshield wiper assembly is designed solely for use in connection with a single style of wiper arm attachment member. In the aftermarket, compatibility between the wiper arm and windshield wiper assembly is a problem. End users are provided with few, if any, options for replacement wiper assemblies and are often required to purchase replacement wiper assemblies from dealerships for the OEM vehicle manufacturer.

As a result of the limited aftermarket availability and limited options associated with beam blade windshield wipers, there is a need in the art for a beam blade windshield wiper assembly having a coupler subassembly that operatively couples a beam blade windshield wiper to several different wiper arm attachment members.

SUMMARY OF THE INVENTION

The present invention overcomes many limitations and disadvantages in the related art of beam blade windshield wiper systems incorporating wiper couplers for use in connecting a beam blade windshield wiper assembly to a wiper arm. To this end, one embodiment of the present invention is directed toward a wiper blade system for use in connection with a wiper arm having an attachment member including a track defined by a base and rails depending therefrom as well as a bent tab extending outwardly from the base and guides that extend linearly downward from the rails. The wiper blade system includes a wiper blade assembly having a wiping element that contacts the surface to be wiped, at least one elongated beam having longitudinal ends that define a predetermined length, a carrier that is operatively engaged to the elongated beam between the longitudinal ends, and an airfoil that is operatively disposed adjacent to the carrier and adapted to operatively connect the elongated beam to the wiping element. A coupler is removably engaged to the carrier and adapted to releasably attach the wiper blade assembly to a wiper arm attachment member. The coupler includes a pair of sidewalls each having a flange adapted to engage a portion of the guides of a wiper arm attachment member. The coupler also includes an elevated platform and a deck, each disposed between the sidewalls. The deck cooperates with a portion of the sidewalls to define a rest adapted to operatively receive the track of a wiper arm attachment member. The coupler further includes an engaging member that is adapted to receive a portion of the bent tab of a wiper arm attachment member to facilitate releasable attachment between the wiper blade assembly and a wiper arm attachment member.

Another embodiment of the present invention is directed toward a wiper blade system for use in connection with a wiper arm having an attachment member including a transversely extending pin and a bent tab. In this context, the wiper blade system includes a coupler that is removably engaged to the carrier and adapted to releasably attach the wiper blade assembly to the wiper arm attachment member. The coupler includes a pair of sidewalls with at least one of the sidewalls including a notch adapted to operatively receive a transversely extending pin of a wiper arm attachment member and a platform disposed between the sidewalls having a recessed section. The coupler also includes a deck and a rest portion disposed between the recessed section and the deck. The rest portion is adapted to operatively receive a portion of a wiper arm attachment member. In addition, the coupler includes a tab depending from the platform adjacent to the recessed section and a locking tang depending from the platform adjacent to the deck. The tab and locking tang are adapted to operatively engage the carrier to releasably connect the wiper blade assembly to the coupler.

The present invention is also directed to another embodiment of a wiper blade system that includes a first coupler that is adapted to be removably engaged to the carrier and releasably attach the wiper blade assembly to a wiper arm attachment member having a track defined by a base and rails depending therefrom along with a bent tab extending outwardly from the base and guides that extent linearly downward from the rails. The first coupler includes a pair of sidewalls each having a flange adapted to engage a portion of the guides of the wiper arm attachment member. The first coupler further includes an elevated platform and a deck each disposed between the sidewalls. The deck cooperates with a portion of the sidewalls to define a rest adapted to operatively receive the track of the wiper arm attachment member. The first coupler also includes an engaging member that is adapted to receive a portion of the bent tab of a wiper arm attachment member to facilitate releasable engagement between the wiper assembly and the wiper arm attachment member. In addition, this embodiment of the present invention also includes a second coupler that is adapted to be removably attached to the carrier and provide releasable attachment to a wiper arm attachment member having a transversely extending pin and a bent tab. The second coupler includes a pair of sidewalls with at least one of the sidewalls having a notch adapted to operatively receive a transversely extending pin of a wiper arm attachment member. A platform is disposed between the sidewalls having a recessed section. A deck and a rest portion are disposed between the recessed section and the deck. The rest portion is adapted to operatively receive a portion of a wiper arm attachment member. The second coupler also includes a tab depending from the platform adjacent to the recessed section and a locking tang depending from the platform adjacent to the deck. The tab and the locking tang are adapted to operatively engage the carrier to releasably connect the wiper blade assembly to the coupler.

Thus, one advantage of the present invention is that it provides a beam blade windshield wiper assembly that is adapted to releasably engage several different wiper arm attachment members, thereby reducing the need for several different windshield wiper assemblies at the OEM level.

Still another advantage of the present invention is that it provides a beam blade windshield wiper assembly having an interchangeable coupler assembly that can engage several different wiper arm attachment members, thereby reducing the need for multiple aftermarket beam blade windshield wiper replacement assemblies having the same superstructure but a different, single-application, coupler assembly to reduce the costs associated with point-of-sale packaging and replacing a beam blade wiper blade assembly.

Other objects, features and advantages of the present invention will be readily appreciated as the same becomes better understood after reading the subsequent description taken in connection with the accompanying drawings.

BRIEF DESCRIPTION OF THE DRAWINGS

FIG. 3 is an exploded view of the windshield wiper assembly illustrated in FIG. 2 in accordance with the present invention.

FIG. 4 is a top view of the carrier of the windshield wiper assembly in accordance with the present invention.

DETAILED DESCRIPTION OF THE PREFERRED EMBODIMENT(S)

Figure 1:
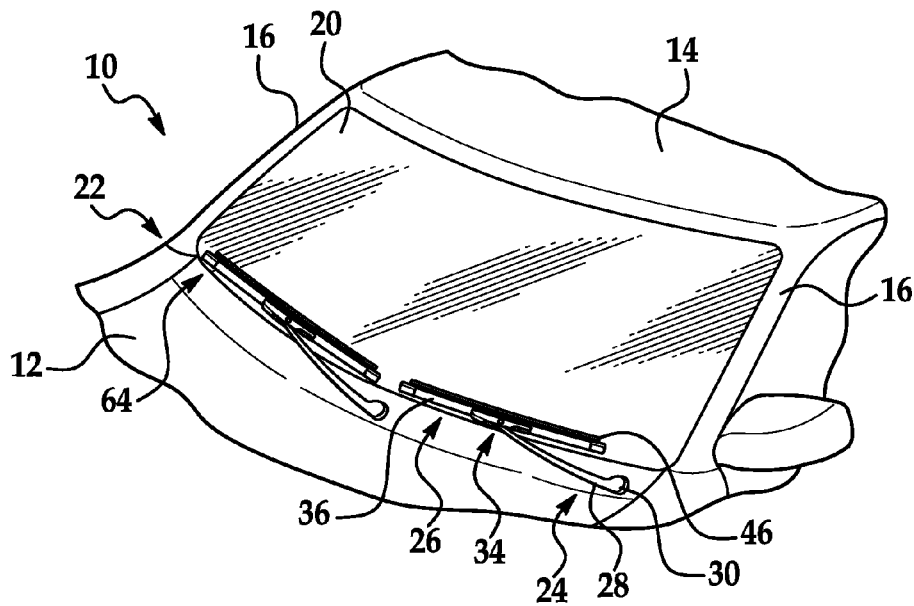
FIG. 1 is a partial perspective view of the front of an automotive vehicle having a pair of windshield wiper assemblies in accordance with the present invention that are pivotally mounted for reciprocal movement across the windshield of the vehicle.

Referring now to the figures, where like numerals are used to designate like structure, a portion of a vehicle is schematically illustrated at 10 in FIG. 1. The vehicle includes a cowl 12, a roof 14, and a pair of laterally spaced front or "A" pillars 16 extending between the roof 14 and the cowl 12. The A-pillars 16, roof 14, and cowl 12 cooperate to support a curved or "swept back" glass windshield 20 located therebetween.

A wiper system is generally indicated at 22 in FIG. 1 and is employed to clean the glass windshield 20. The wiper system 22 includes a wiper arm, generally indicated at 24 and a beam blade windshield wiper assembly of the present invention, generally indicated at 26, (hereinafter referred to as a "wiper assembly"). The wiper assembly 26 is releasably engaged to the wiper arm 24 and adapted to clean the surface to be wiped, namely a windshield 20. Those having ordinary skill in the art will appreciate that a wiper system 22 may include more than wiper arm 24 and wiper assembly 26. By way of example and as indicated in FIG. 1, a wiper system 22 includes a pair of wiper arms 24 and wiper assemblies 26, which correspond to the driver and passenger side of the vehicle 10. Furthermore, those having ordinary skill in the art will appreciate, that wiper assemblies 26 may be employed in other areas of a vehicle 10, such as a rear window (not shown) or a head lamp (not shown) that employs a wiper system 20. Thus, it will be understood that the present invention is not limited for use solely in connection with wiper arms 24 adjacent to a vehicle's windshield 20, but for use in all applications where wiper assemblies 26 are employed.

The wiper arm 24 includes an elongate body 28 having a pivot end 30 that is operatively engaged to a motor (not shown) that drives the wiper arm 24 in an oscillating manner across the windshield 20. More specifically, the elongate body 28 is operatively attached to the pivot end 30 in a hinged manner to enable a person to elevate the elongate body 28 away from the windshield 20. Articulation between the pivot end 30 and elongate body 28 in this manner is conventionally known to enable maintenance or inspection of the wiper system 22 and/or windshield 18 as well as for removal and installation of wiper assemblies 26. Those having ordinary skill in the art will appreciate that the wiper arm 24 may further include a biasing member to impart a downward force through the wiper arm 24 and onto the wiper assembly 26 to facilitate contact between the wiper assembly 26 and the windshield 20 of the vehicle 10. By way of example, the biasing member may include a spring. It should further be appreciated that the elongate body 28 of the wiper arm 24 may include a cavity adjacent to the pivot end 30 to operatively receive the biasing member.

Figure 11:
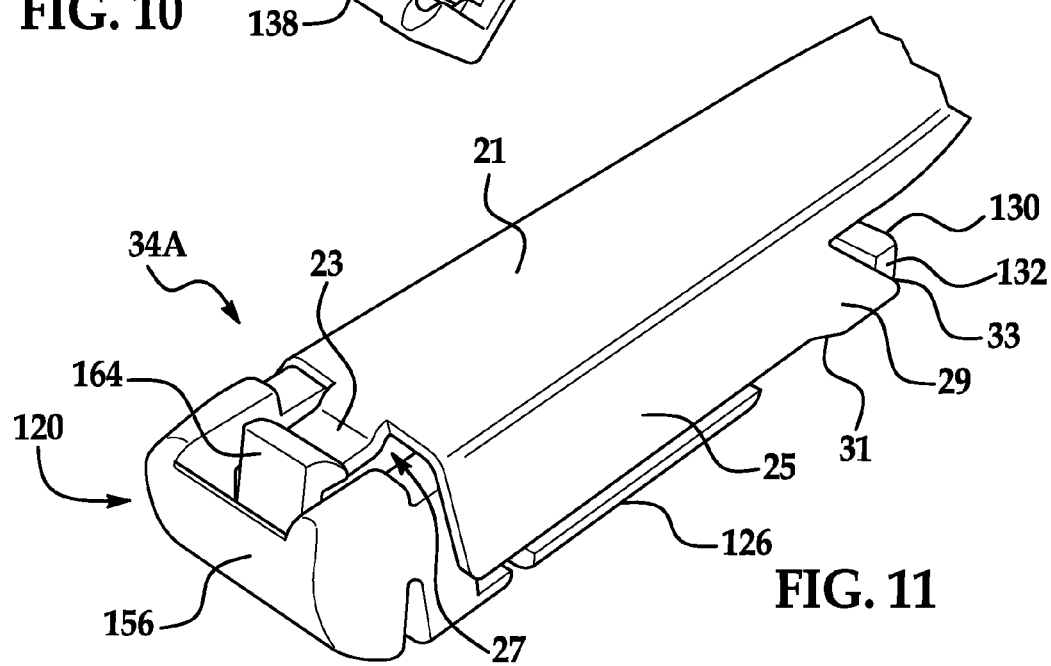
FIG. 11 is a top perspective view of the embodiment of the coupler assembly illustrated in FIG. 8A operatively attached to a first type of wiper arm attachment member.
Figure 12:
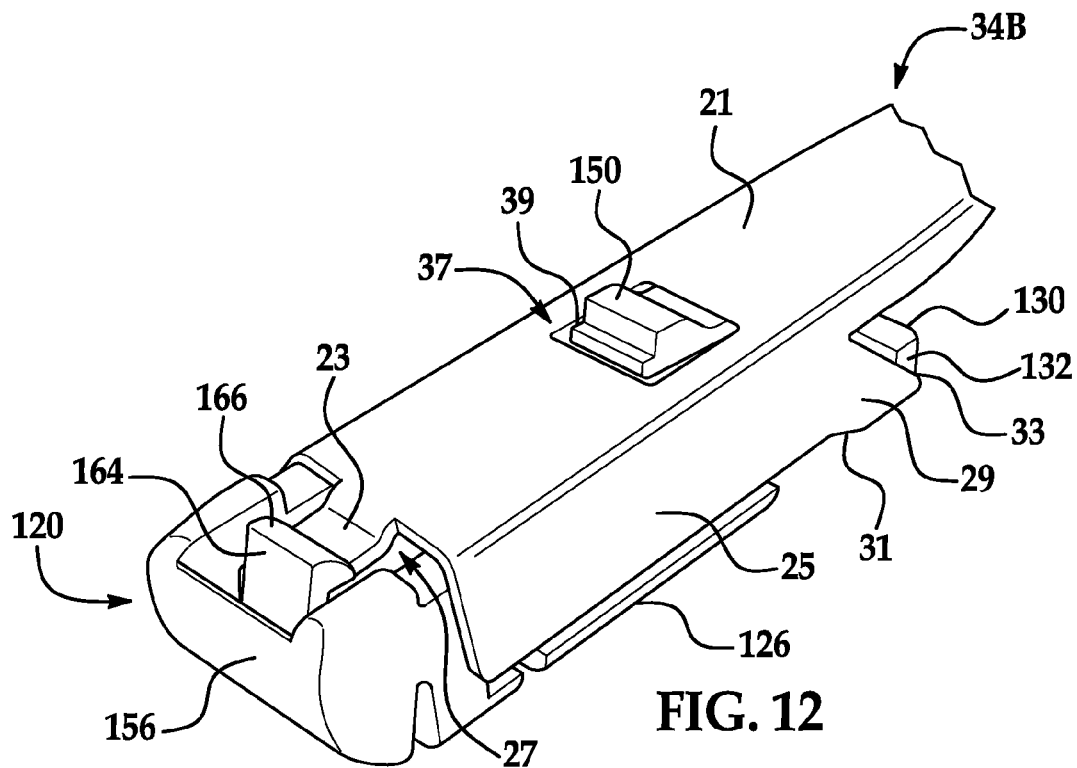
FIG. 12 is a top perspective view of the embodiment of the coupler assembly illustrated in FIG. 8A operatively attached to a second type of wiper arm attachment member.
Figure 16:
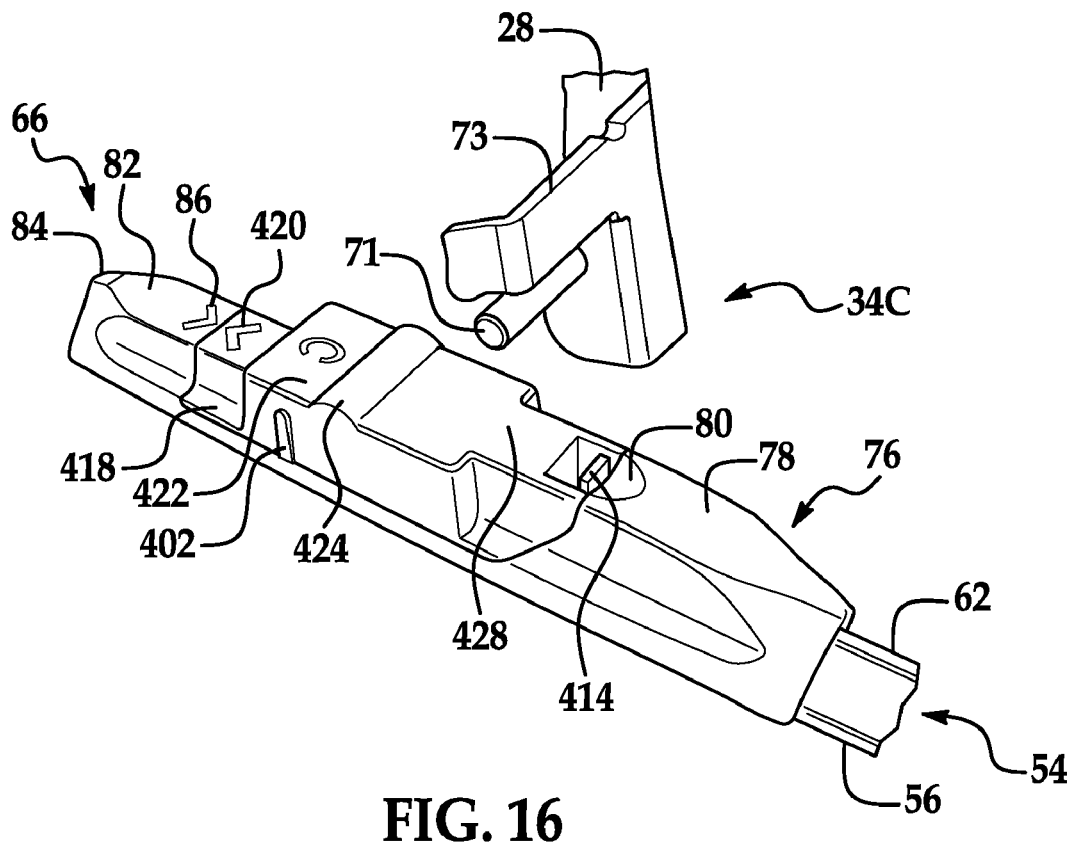
FIG. 16 is a fragmentary perspective view of the windshield wiper assembly having the embodiment of the coupler assembly illustrated in FIG. 13 operatively attached thereto in accordance with the present invention and adjacent to a wiper arm attachment member.
Figure 17:
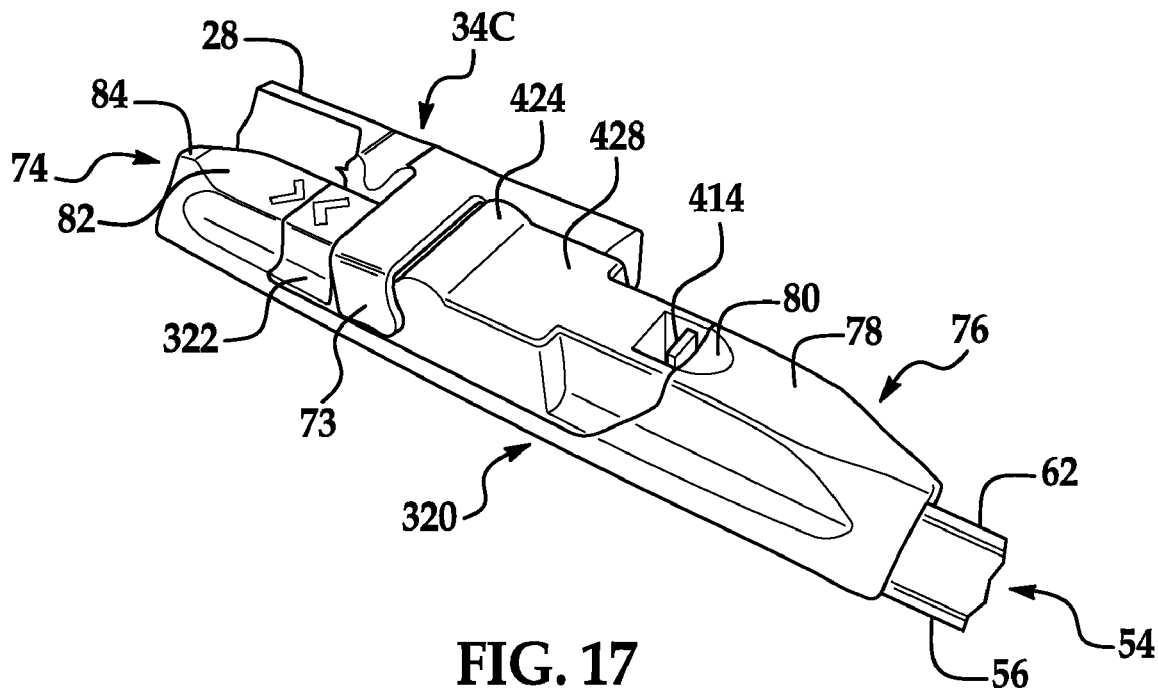
FIG. 17 is a fragmentary perspective view of the windshield wiper assembly having the embodiment of the coupler assembly illustrated in FIG. 13 operatively attached thereto in accordance with the present invention and operatively attached to the wiper arm attachment member illustrated in FIG. 16.

As shown in FIGS. 1, 11, 12, 16 and 17, the wiper arm 24 further includes an attachment member, generally indicated at 34, that extends from the elongate body 28. FIG. 11 shows a pinch tab-type attachment member 34A. FIG. 12 shows a push button-type attachment member 34B. FIGS. 16 and 17 show a bent tab-type attachment member 34C. Pinch tab-type, push button-type and bent tab-type attachment members 34A-34C have been traditionally employed for connection to a beam blade windshield wiper assembly having a fixed coupler assembly the restricts use of the wiper assembly to a single type of wiper arm attachment member. However, the present invention provides a beam blade windshield wiper assembly having a removable/interchangeable coupler assembly to provide a beam blade windshield wiper assembly fur use in connection with several different wiper arm attachment members 34A-C.

Figure 2:
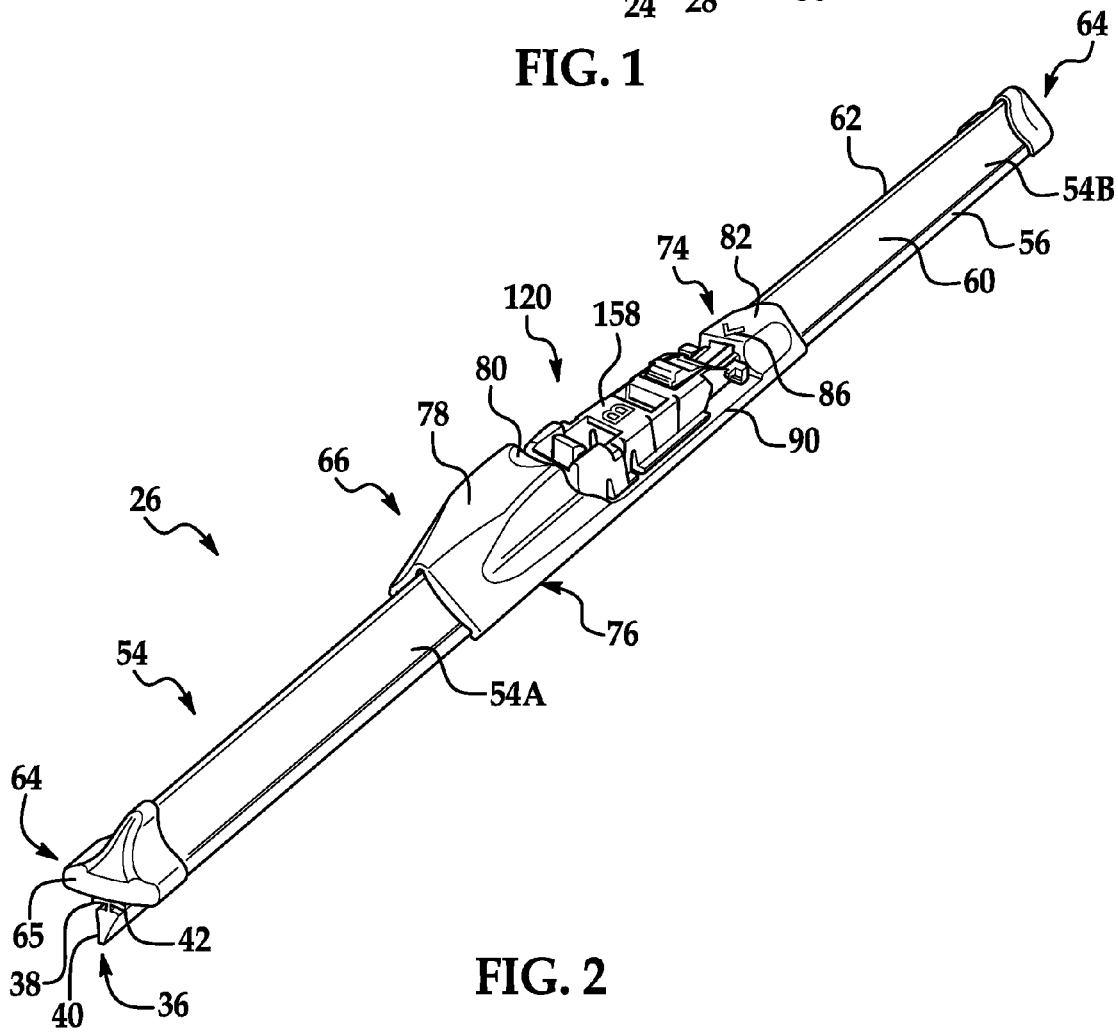
FIG. 2 is a perspective view of the windshield wiper assembly having one embodiment of the coupler assembly operatively attached thereto in accordance with the present invention.
Figure 5:
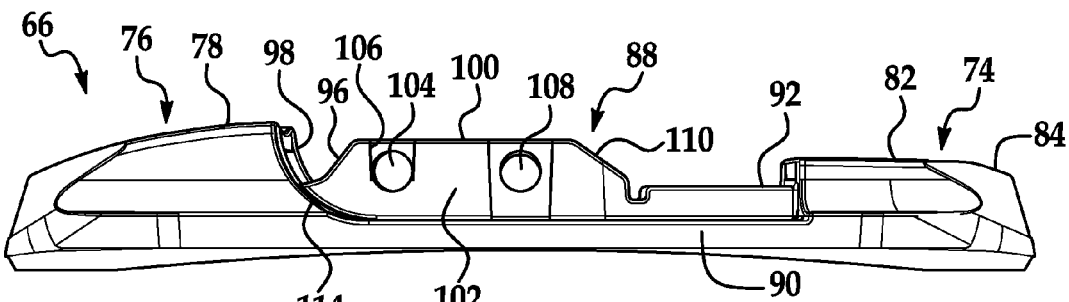
FIG. 5 is a side view of the carrier of the windshield wiper assembly in accordance with the present invention.
Figure 6:
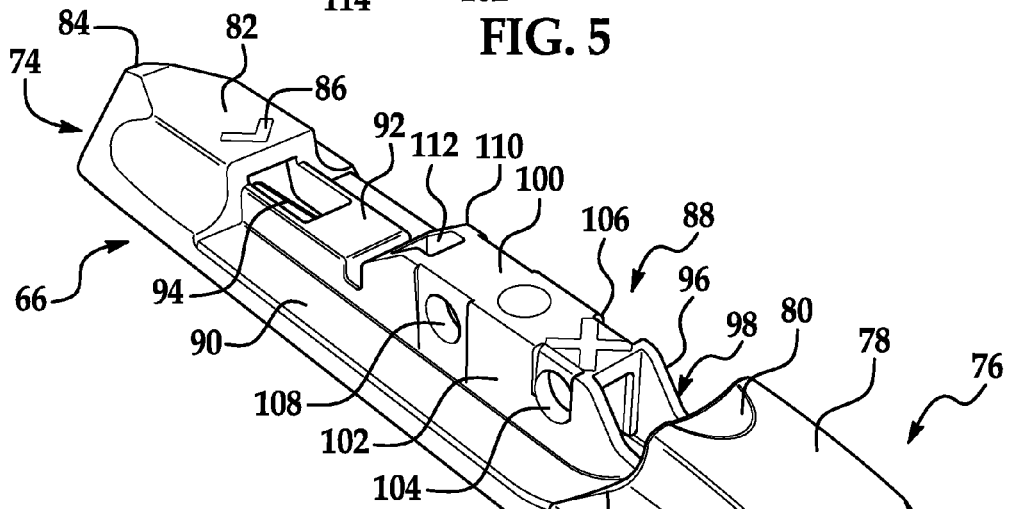
FIG. 6 is a top perspective view of the carrier of the windshield wiper assembly in accordance with the present invention.

Referring to FIGS. 1-3, the wiper assembly 26 includes a wiping element, generally indicated at 36, that is adapted to contact the surface of the vehicle 10 to be wiped, in this representative example, the windshield 20. The wiping element 36 includes an upper section 38 and a lower section 40 that are segmented by a longitudinally extending partition 42. The partition 42 provides flexibility between the upper section 38 and lower section 40 during operational movement of the wiper assembly 24. The upper section 38 is adapted to facilitate attachment to additional components of the wiper assembly 26, as described in greater detail below, while the lower section 40 is adapted to engage the surface to be wiped.

The wiping element 36 includes a predetermined length and cross-sectional profile corresponding to a particular application and is typically manufactured through an extrusion process, which enables the length and cross-sectional profile of the wiping element 36 to be easily adjusted without a substantial increase to manufacturing expense. Furthermore, while the wiping element 36 of the present invention is constructed from a flexible rubber. Those having ordinary skill in the art will appreciate that the wiping element 36 may be constructed from any flexible material, such as silicone or other polymer, and via any manufacturing process, such as injecting molding, without departing from the scope of the invention.

The wiper assembly 26 of the present invention further includes an elongated beam, generally indicated at 44, that operatively engages the wiping element 36. The elongated beam 44 is adapted to distribute downward pressure from the wiper arm 24 across the wiping element 36. As a result, the elongated beam 44 includes longitudinal ends 46 and 48 that define a predetermined length capable of facilitating distribution of the downward pressure from the wiper arm assembly 24. The elongated beam 44 further includes a top end 50 and a bottom end 52 disposed between the longitudinal ends 46 and 48. In the embodiment illustrated in the figures, the wiping element 36 is operatively engaged to the bottom end 52 of the elongated beam 44 by an adhesive/epoxy. However, those having ordinary skill in the art will appreciate that the elongated beam 44 may be operatively engaged to the wiping element 36 by other methods such as through a slot defined within the elongated beam 44 that receives a portion of the wiping element 36. Furthermore, those having ordinary skill in the art will appreciate that the wiper assembly 26 of the present invention may include more than one elongated beam 44 that is operatively engaged to the wiping element 36.

The elongated beam 44 may be constructed from any resiliently flexible material, such as spring steel or a polymer, that facilitates the application of force from the spring-loaded wiper arm 24 across the span of the elongated beam 44 toward the first and second longitudinal ends 46 and 48. To that end, the elongated beam 44 may be curved longitudinally with a predetermined radius of curvature that is the same or greater than the plane of curvature of the windshield 20. This predetermined radius of curvature is sometimes referred to in the related art as a "free form" radius of curvature (hereinafter "windshield curvature"). Accordingly, the curvature of the elongated beam 44 may be symmetrical or asymmetrical depending on the force requirements and the contour of the windshield 20. The flexible, free form, pre-curved elongated beam 44 straightens out when the wiper arm 24 applies a force thereto to flatten the elongated beam 44 and direct the wiping element 36 to contact the windshield 20. Thus, the elongated beam 44 includes a free-form curvature that ensures force distribution on windshields having various curvatures that effects proper wrapping about the windshield 20.

The elongated beam 44 includes a substantially constant thickness and may have a constant width throughout the length between the first and second longitudinal ends 46 and 48. The constant thickness is adapted to provide high lateral and torsional stiffness to avoid lateral and torsional deflection, which causes the wiping element 36 to stick/slip ("chatter") on the windshield 20 during operation. Thus, the cross-section of the elongated beam 44 is substantially uniform, which makes it easier to manufacture. More specifically, where the elongated beam 44 is constructed from metal, such as spring steel, the tools and machinery used to manufacture the elongated beam 44 are less complicated than that required to manufacture a beam 44 having a varying thickness. Furthermore, where the elongated beam 44 is constructed from a polymer, such as a thermoplastic elastomer, the tools and extrusion process machinery are also less complicated than those employed to manufacture an elongated beam having a varying thickness. However, those having ordinary skill in the art will appreciate that the elongated beam 44 illustrated herein may include a varying thickness and/or outer profile (width) without departing from the scope of the invention. By way of example, the width and/or thickness of the elongated beam 44 may taper linearly from the beam center, sinusoidally, parabolically, or asymmetrically. Additionally, the elongated beam 44 illustrated throughout the figures is a single, integral piece of material such that it defines a solid cross-section. However, those having ordinary skill in the art will appreciate that the elongated beam 44 may be formed into a single piece or multiple pieces by a plurality of laminates.

The wiper assembly 26 of the present invention further includes an airfoil, generally indicated at 54, to reduce the likelihood of wind lift during operational movement across the surface to be wiped. The airfoil 44 includes two segments 54A and 54B that include identical structure. Accordingly, the same reference numerals will be used to describe the structure of the two segments 54A and 54B of the airfoil 54. However, those having ordinary skill in the art will appreciate that the airfoil 54 may also be constructed as a single unit.

The airfoil 54 includes a base, generally indicated at 56. The base 56 includes an attachment portion 58 that engages the elongated beam 44. More specifically, the attachment portion 58 of each of the segments 54A and 54B engage a portion of the top end 50 and bottom end 52 between the longitudinal ends 46 and 48, thereby joining the airfoil 54, wiping element 36 and elongated beam 44 together. Those having ordinary skill in the art will appreciate that the airfoil 54, elongated beam 44 and wiping element 36 may be joined together through other means such as bonding the airfoil 54 to the top end 50 of the elongated beam 44 via adhesive/epoxy or by employing additional structure such as a retainer or spline that couples the wiping element 36 to the elongated beam 44 or the elongated beam 44 to the airfoil 54 without departing from the scope of the invention.

The airfoil 54 further includes a spoiler 60 that is adapted to utilize airflow to increase downward force on to the wiper assembly 26 during operational movement across the surface to be wiped. To this end, the spoiler 60 tapers inwardly from the base 56 toward a terminal point 62 to define a profile that is slightly contoured. As shown in FIGS. 2 and 3, the profile of the spoiler 60 is substantially symmetrical in cross-section. However, those having ordinary skill in the art will appreciate that the spoiler 60 may include an asymmetrical cross-sectional profile without departing from the scope of the invention. Additionally, those having ordinary skill in the art will appreciate that the airfoil 54 may include a solid-core spoiler 60 or a hollow-core spoiler 60 without departing from the scope of the invention. The airfoils 54A and 54B of the present invention are manufactured from a thermoplastic material and using a manufacturing process that may be the same as described above relative to the wiping element 36. However, it should be appreciated that the airfoils 54 may be manufactured using a different process and/or different material. By way of example, the airfoils 54 may be manufactured via an injection molding process using a polymer composition having greater hydrophobic properties than the materials used for manufacturing the wiping element 36.

The wiper assembly 26 of the present invention further includes a pair of end caps, generally indicated at 64. The end caps 64 are adapted to operatively engage the airfoil 54. The end caps 64 include a profile that substantially mimics the contours of the airfoil 54 to maintain the wind lift characteristics of the wiper assembly 26 and to provide an increased aesthetic value. The end caps 64 include a closed end 65 that covers the longitudinal ends 46 and 48 of the elongated beam 44. The closed end 65 prevents infiltration of water, ice, and debris between the elongated beam 44 and the airfoil 54, which may prevent proper operation of the wiper assembly 26. The closed end 65 of the end caps 64 may be adapted to extend beyond the longitudinal ends 46 and 48 of the elongated beam 44 to facilitate contact between the outer extremities of the wiping element 26 and the surface to be wiped. More specifically, the end caps 64 provide a mass increase adjacent to the longitudinal ends 46 and 48 of the elongated beam 44 that reduce the likelihood of localized chatter along the extremities of the wiping element 26 caused by the combination of wind lift and a decrease in the force distributed to this area from wiper arm 24 via the elongated beam 44, as described above.

The wiper assembly 26 further includes a carrier, generally indicated at 66, that is disposed along an intermediate position between the first and second airfoils 54A and 54B. Contrary to conventional beam blade-style wiper assemblies, which include a small contact point through which force from the wiper arm 24 is distributed, the carrier 66 of the present invention broadens the initial point through which force is applied from the wiper arm 24 to the elongated beam 44. In this manner, the downward force from the wiper arm 24 is distributed with more efficiency across the elongated beam 44, thereby reducing the likelihood of wind lift and improving wiping action.

Figure 7:
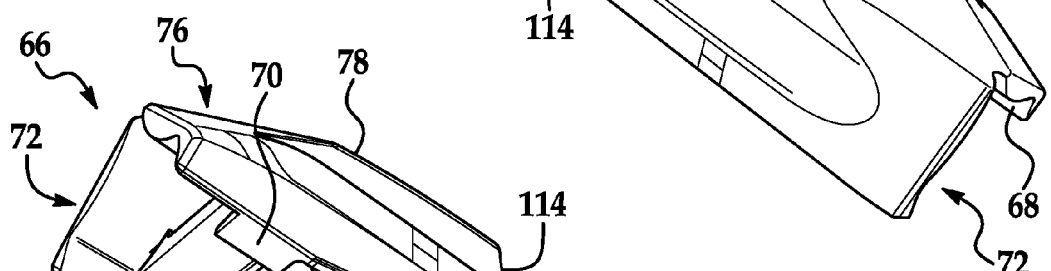
FIG. 7 is a bottom perspective view of the carrier of the windshield wiper assembly in accordance with the present invention.
Figure 8A:
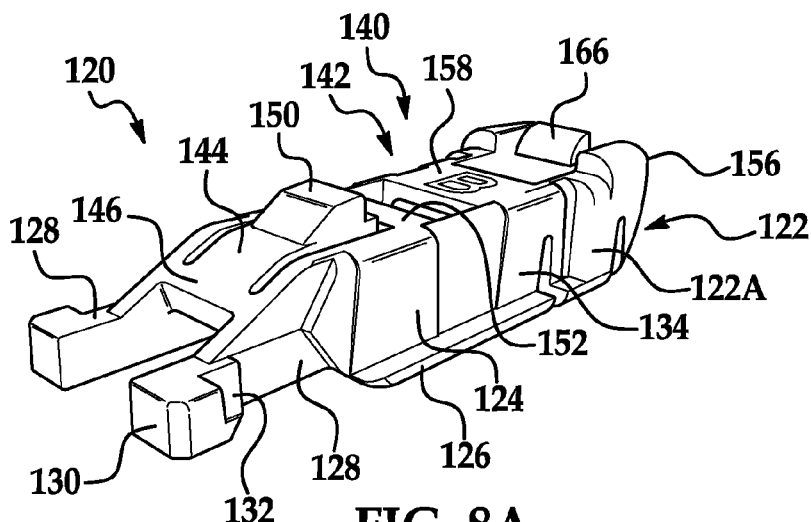
FIG. 8A is a right side perspective view of the embodiment of the coupler assembly illustrated in FIG. 2 for the windshield wiper assembly of the present invention.
Figure 8B:
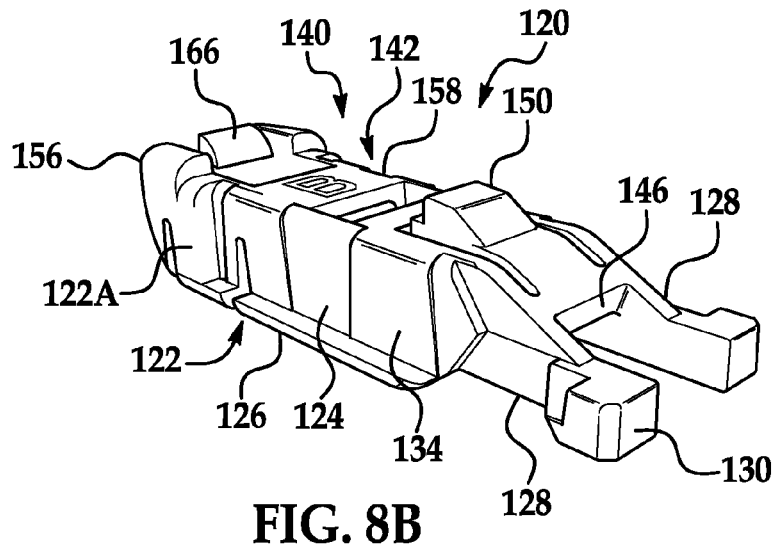
FIG. 8B is a left side perspective view of the embodiment of the coupler assembly illustrated in FIG. 8A.

Referring to FIGS. 2-7, the carrier 66 includes an interior surface 68 that is disposed in proximate relation to the elongated beam 44. The interior surface 68 includes a plurality of transversely extending tangs 70 that are adapted to operatively engage the bottom end 52 of the elongated beam 44. The tangs 70 cooperate with the remaining structure of the interior surface 68 to define a track, generally indicated at 72, that operatively receives an intermediate portion of the elongated beam 44. As shown in FIG. 7, the interior surface 68 includes four transversely extending tangs 70 operatively disposed adjacent to the airfoil segments 54A and 54B to accommodate the resiliency of the elongated beam 44. In this manner, a portion of the elongated beam 44 is retained within the track 72, but remains able to flex in response to the curvature of the surface to be wiped.

It should be appreciated that the airfoil segments 54A and 54B restrict the axial movement of the carrier 66 relative to the elongated beam 44. However, those having ordinary skill in the art will appreciate that the tangs 70 may include additional structure to prevent axial movement between the carrier 66 and the elongated beam 44. By way of example, one or more of the tangs 70 may further include a post and the elongated beam 44 may include a corresponding detent that is adapted to receive the post to prevent such axial movement of the carrier 66 relative to the elongated beam 44. Those having ordinary skill in the art will appreciate that the elongated beam 44 may be operatively attached to the carrier 66 by several methods other than as described above. By way of example, the carrier 66 may be fixed by adhesive, riveted or welded to the elongated beam 44.

The carrier 66 further includes a low-profile end, generally indicated at 74, that is disposed adjacent to one of the airfoil segments 54A and a high-profile end, generally indicated at 76, that is disposed adjacent to the other airfoil segment 54B. The high-profile end 76 and the low-profile end 74 each include a contoured exterior that substantially corresponds to the contoured profile of the airfoil segments 54A and 54B. The high-profile end 76 includes an arcuate top surface 78 that tapers downwardly toward one of the airfoil segments 54B. The arcuate top surface 78 includes a depression 80 therein that will be described in greater detail below. The low-profile end 74 includes a substantially planar top surface 82 and an angled region 84 that tapers toward one of the airfoil segments 54A. The planar top surface 82 of the low-profile end 74 further includes an alignment member 86 defined thereon that will be described in greater detail below.

The carrier 66 further includes a saddle, generally indicated at 88. The saddle 88 is disposed between the high and low-profile ends 76 and 74, respectively. The saddle 88 is adapted to releasably engage a coupler assembly, that will be described in greater detail below. The saddle 88 includes a substrate 90 that extends between the high-profile end 76 and the low-profile end 74 and a back jockey 92 that extends vertically from the substrate 90 and adjacent to the low-profile end 74. The back jockey 92 includes an access 94 that enables a portion of a coupler assembly to be located adjacent to the track 72 of the carrier 66 within the low-profile end 74, as will be described in greater detail below. The saddle 88 further includes a front jockey 96 that extends vertically from the substrate 90, adjacent to the high-profile end 76. The front jockey 96 includes a gullet 98 that enables a portion of a coupler assembly to be located adjacent to the track 72 of the carrier 66 within the high-profile end 76, as will be described in greater detail below.

The saddle 88 further includes a seat 100 that is disposed between the front jockey 96 and the back jockey 92 and a skirt 102 that depends from the seat 100. The skirt 102 is adapted to provide an interference fit between the seat 100 and the coupler assembly, as will be described in greater detail below. The saddle 88 further includes a pair of blind bores 104 that are aligned with respect to each other on opposite sides of the skirt 102. The blind bores 104 are located in proximate relation to the front jockey 96. The saddle 88 further includes a recessed façade 106 that is located between the blind bores 104 and the seat 100. The recessed façade 106 is adapted to facilitate positive alignment of a portion of the coupler assembly to be received within the blind bores 104. A port 108 extends through the skirt 102 in proximate relation to the back jockey 92. The port 108 is adapted to receive a portion of a wiper arm attachment member that typically exclusively adapted for use in connection with a beam blade windshield wiper assembly. The seat 100 includes a cantle 110 that extends downwardly toward the back jockey 92. The cantle 110 includes a cut-out section 112 that is adapted to facilitate operative attachment to a coupler assembly and/or facilitate releasable engagement between a coupler assembly and a wiper arm attachment member. Additionally, the cantle 110 cooperates with the back jockey 92 to provide a pivot area wherein a coupler assembly is able to pivot without interference from the saddle 88. The saddle 88 further includes a pair of fenders 114 that are operatively disposed along opposite sides of the seat 100, adjacent to the front jockey 96. More specifically, the fenders 114 extend vertically from the substrate 90 along an arcuate path toward the high-profile end 76 and cooperate with the cantle 96 and back jockey 92 to enable a coupler assembly to pivot without interference.

Referring to FIGS. 2, 3, 8A-12, the wiper assembly 26 of the present invention further includes a coupler assembly, generally indicated at 120. The coupler assembly 120 is adapted to facilitate removable attachment between the wiper assembly 20 and the attachment member 34. As shown in FIGS. 11 and 12, the attachment members 34A and 34B include a base 21 and bent tab 23 extending linearly outward from the base 21. The attachment members 34A and 34B have a pair of rails 25 depending from the base 21 aligned with respect to each other. The base 21 and rails 25 cooperate to define a track, generally indicated at 27, that operatively receives a portion of the coupler assembly 20, as will be described in greater detail below. Each of the rails 25 includes a guide 29 that extends linearly downward relative to the rails 25. Each of the guides includes a leading edge 31 and a trailing edge 33, the function of each will be described in greater detail below. The trailing edge 33 is angled relative to the base 21, such that the leading edge 31 and the trailing edge 33 form an acute angle. However, those having ordinary skill in the art will appreciate that trailing edge 33 may also extend substantially perpendicular relative to the base without departing from the scope of the invention.

According to one embodiment, the coupler assembly 120 includes a pair of sidewalls, generally indicated at 122. Each of the sidewalls 122 defines a surface 122A disposed generally opposed relative to the other. The opposed surfaces 122A include a recessed section 124 adapted to operatively engage the rails of the attachment member 34. The recessed section 124 is partially defined within the opposed surfaces 122A by a lip 126 that provides a positive stop with respect to the rails 25 of the attachment member 34 when the wiper assembly 26 is attached to the wiper arm 24.

Each recessed section 124 is further defined by a flange 128 that extends outward beyond the lip to provide releasable engagement with the attachment member 34. More specifically, each flange 128 includes a terminal edge 130 and a barb 132 disposed adjacent to the terminal edge 130. The barb 132 is adapted to engage the trailing edge 33 of the guides 29 and thereby facilitates releasable engagement between the flange 128 and the guides 29 of the attachment member 34. The recessed section 124 further includes at least one raised façade 134 that provides an interference fit between the coupler assembly 120 and the rails 25 of the attachment member 34. Those having ordinary skill in the art will appreciate that the raised façade 134 also provides additional support to the sidewalls 122 and that the recessed section 124 may include more than one raised façade 134.

Figure 9A:
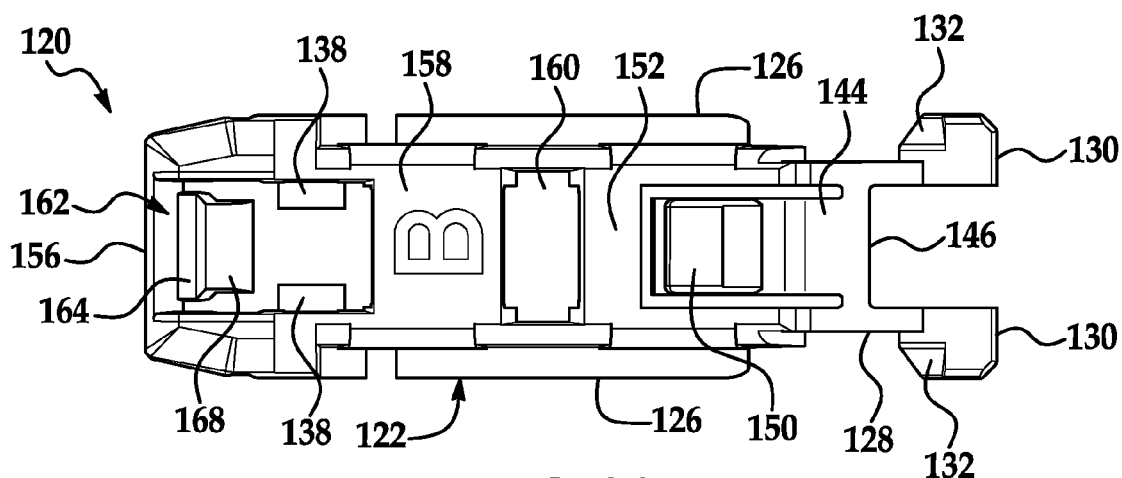
FIG. 9A is a top view of the embodiment of coupler assembly illustrated in FIG. 8A.
Figure 9B:
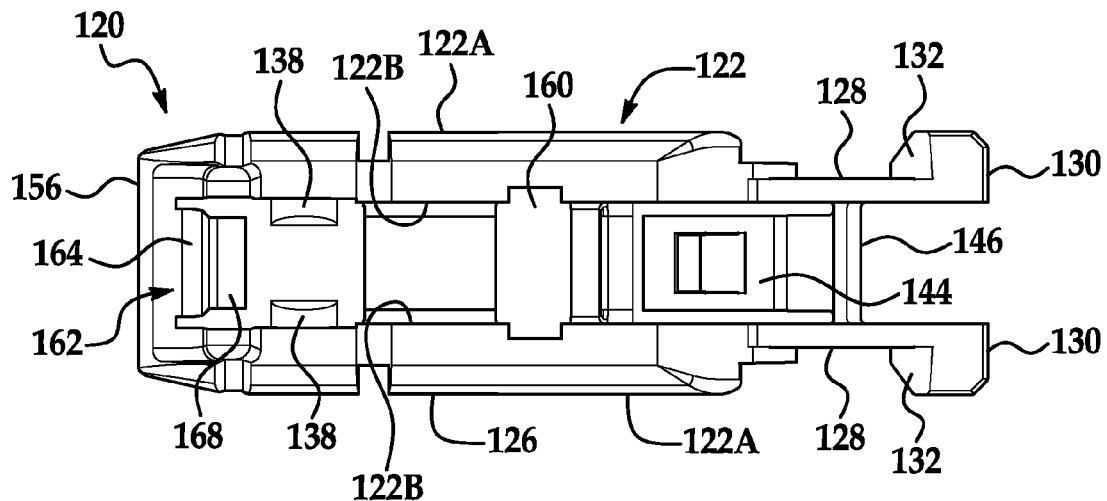
FIG. 9B is a bottom view of the embodiment of coupler assembly illustrated in FIG. 8A.
Figure 10:
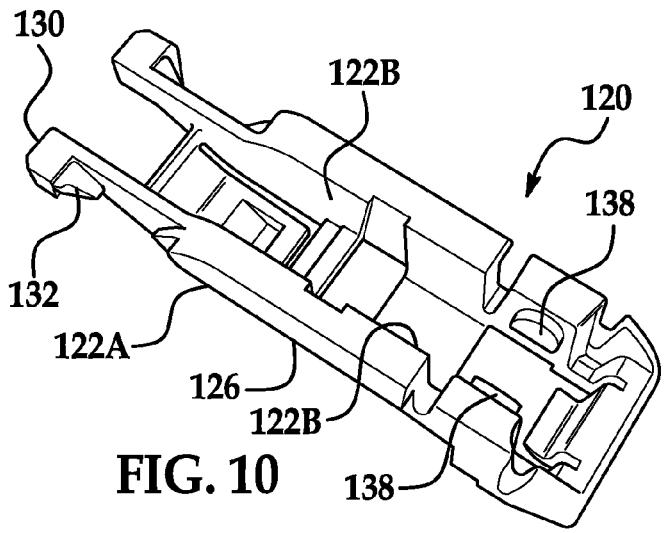
FIG. 10 is a bottom perspective view of the embodiment of coupler assembly illustrated in FIG. 8A.

Referring now to FIGS. 9B and 10, each of the sidewalls 122 further includes an inward surface 122B that face each other. The inward surfaces 122B are adapted to operatively engage a portion of the carrier 66. The inward surfaces 122B include posts 138 that extend transversely from their respective inward surface 122B and toward each other. The posts 138 operatively engage the aligned bores 104 of the saddle 100 and provide a bearing surface about which the coupler assembly 120 may pivot relative to the carrier 66. Those having ordinary skill in the art will appreciate that the inward surfaces 122B may further include additional structure. By way of example the inward surfaces 122B may include one or more support ribs to provide interference fit between the sidewalls 122 and the carrier 66 as well as increase the structural integrity of the sidewalls 122.

Referring now to FIGS. 8A-9A, the coupler assembly 120 further includes a deck, generally indicated at 140, disposed between the sidewalls 122. The deck 140 cooperates with the recessed sections 124 of the sidewalls 122 to define a rest, generally indicated at 142, that is adapted to operatively receive the track 27 of the attachment member 34. The deck 140 includes a cantilevered beam 144 that is disposed between the flanges 128 so as to define a distal end 146 of the deck 140. The cantilevered beam 144 includes a raised portion 150 that is adapted to provide an interference fit against the track 27 of the attachment member 34, such that the cantilevered beam 144 is entirely disposed within the track 27 when the coupler assembly 120 is operatively attached to the wiper arm 24.

The deck 140 further includes a bridge 152 disposed between the sidewalls 122. The bridge 152 provides a stop to prevent undesired disconnect between the wiper arm 24 and the coupler assembly 120. More specifically, should the barbed flanges 128 unintentionally disengage from the guides 29, the bridge 152 will stop the linear movement of the bent tab 23 relative to the coupler assembly 120 so as to prevent the wiper arm 24 from separating from the wiper assembly 26. Those having ordinary skill in the art will appreciate that the bridge 152 further provides structural support between the sidewalls 122.

With continuing reference to FIGS. 8A-9B, the coupler assembly 120 includes a nose 156 and an elevated platform 158 that are disposed between the sidewalls 122. The elevated platform 158 cooperates with the sidewalls 122 and the bridge 152 to define an aperture 160 therebetween. Those having ordinary skill in the art will appreciate that the elevated platform 158 additionally provides structural support between the sidewalls 122. The coupler assembly 122 further includes an engaging member, generally indicated at 162, that is disposed adjacent to the nose 156. More specifically, the engaging member 162 includes a cantilevered body 164 that depends from the nose 156 and has a bulbous head 166 disposed at the terminal end of the cantilevered body 164. The bulbous head 166 includes a ridge 168 depending therefrom. The ridge 168 is adapted to receive a portion of the bent tab 23 to prevent undesired release of the coupler assembly 120 from the attachment member 34. More specifically, the ridge 168 provides an interference fit between a portion of the bent tab 23 and the engaging member 162. Additionally, those having ordinary skill in the art will appreciate that a wiper arm attachment member 34 may include additional structure, such as a lip or the like within the bent tab 23.

Another wiper arm attachment member 34B is shown in FIG. 12 and includes structure similar to the structure of the attachment member 34A shown in FIG. 11. Thus, like numerals as used in FIG. 11 are also used in FIG. 12 to designate like structure. However, unlike the attachment member 34A shown in FIG. 11, the attachment member 34B shown in FIG. 12 further includes a passage, generally indicated at 37, that is defined within the base 21 by a peripheral edge 39. The attachment member 34B further includes a contoured protrusion (not shown) that depends from the base 21, within the track 27, and toward the engaging member 162 such that the contoured protrusion and the bent tab 23 extend in substantially the same direction. Accordingly, when the coupler assembly 120 is operatively engaged to the attachment member 34B, the contoured protrusion is received by the aperture 160, under the platform 158, and the raised portion 150 of the cantilevered beam 144 is received within the passage 37.

The embodiment of the wiper assembly of the present invention illustrated in FIGS. 2, 3, 8A-12 is properly assembled when the coupler assembly 120 is seated on the saddle 88 of the carrier 66 and the aligned posts 138 operatively engage the blind bores 104. This embodiment of the coupler assembly 120 of the wiper assembly 26 is properly attached to either of the wiper arm attachment members 34A or 34B by inserting the bent tab 23 under the ridge 168, and rotating the wiper assembly 26 such that the barbs 132 of the flanges 128 flex between the guides 29 and then expand outward to be seated adjacent the trailing edges 33. Regardless of the style of attachment member 34A or 34B shown in FIGS. 11 and 12, proper attachment of the wiper assembly 26 is further achieved when the track 27 of either attachment member 34A or 34B is seated on the rest 142. On the other hand, replacement of the wiper assembly 26 of the present invention illustrated in FIGS. 2, 3, 8A-12 is accomplished by applying force to the barbs 132 in an inward direction toward each other, thereby disengaging the barbs 132 from contact with the trailing edges 33 and rotating the wiper assembly 26 away from the wiper arm 24 such that the bent tab 23 disengages from contact with the ridge 168.

Another embodiment of the wiper coupler assembly according to the present invention is generally indicated at 320 in FIGS. 13-17 where like numerals, increased by 200 with respect to the embodiment of the invention illustrated in FIGS. 2, 3, 8A-12, are used to designate like structure. More specifically, the coupler assembly 320 is adapted to operatively engage the carrier 66 in a manner that is similar to the coupler 120 illustrated in FIGS. 2, 3, 8A-12 but includes different structure that is adapted to releasably connect to a wiper arm attachment member 34C having different structure than the wiper arm attachment members 34A and 34B illustrated in FIGS. 11 and 12. To this end, the wiper arm attachment member 34C shown in FIGS. 13-17 includes a pin 71 that extends transversely from the body 28 and a bent tab 73 that also extends transversely from the body 28 adjacent the pin 71. The pin 71 and bent tab 73 cooperate to attach the wiper arm 24 to a wiper assembly 26, as will be described in greater detail below.

Figure 13:
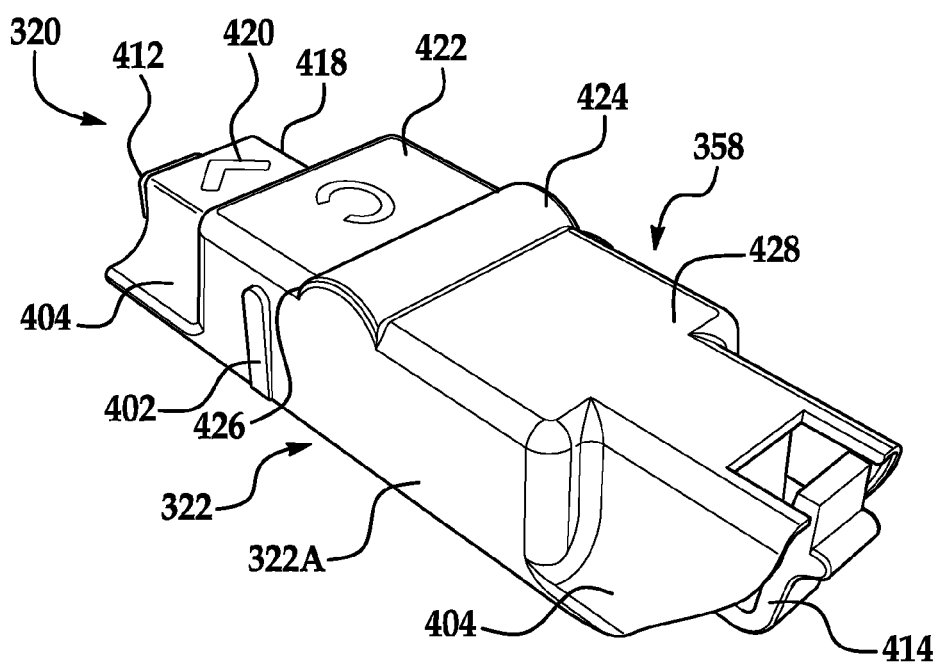
FIG. 13 is a left side perspective view of another embodiment the coupler assembly of the windshield wiper assembly of the present invention.
Figure 14:
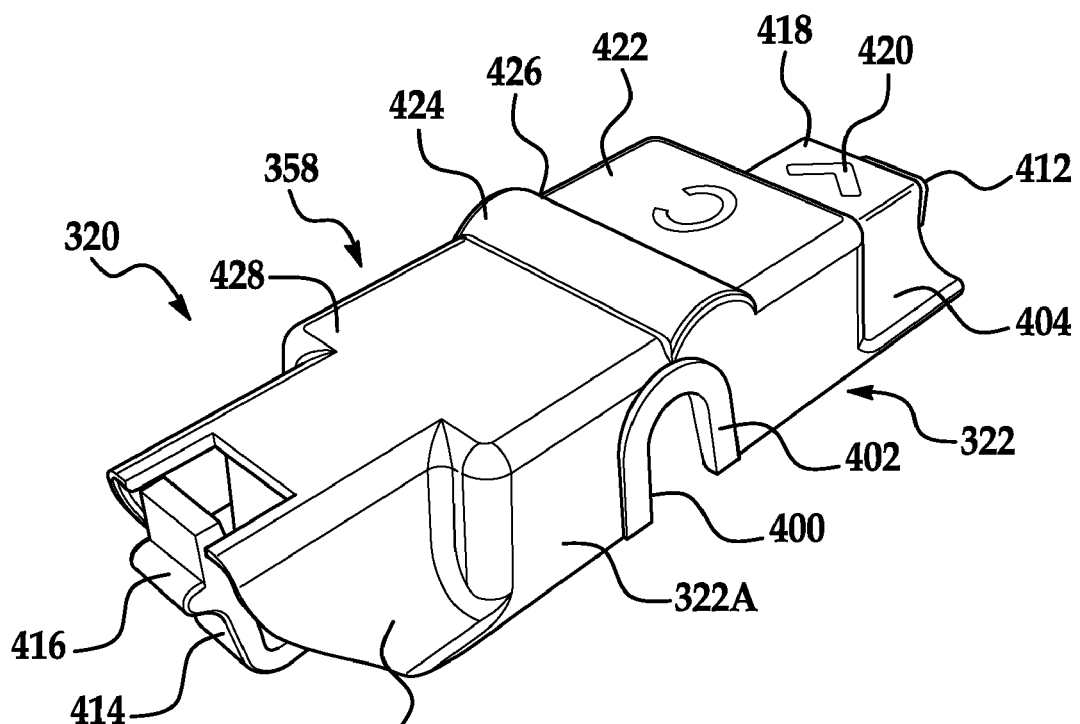
FIG. 14 is a right side perspective view of the embodiment of the coupler assembly illustrated in FIG. 13 in accordance with the present invention.

The coupler assembly 32D illustrated in FIGS. 13-17 includes a pair of sidewalls, generally indicated at 322. One of the sidewalls 322 includes a notch 400 that is adapted to operatively receive a portion of the transversely extending pin 71 of the wiper arm attachment member 34C. More specifically, the notch 400 facilitates the ability of the transversely extending pin 71 to operatively engage the port 108 within the saddle 88 of the carrier 66. Each of the sidewalls 322 includes at least one raised surface 402 to provide additional support along the areas which may receive the highest amount of stress during operation of the wiper system 22. However, those having ordinary skill in the art will appreciate that the sidewalls 322 may include more than one raised surface 402 to accomplish a similar end. As shown in FIGS. 13 and 14, the sidewalls include at least one contoured section 404 that corresponds to the contour of the carrier 66 to provide improved aesthetics and wind lift resistance.

Figure 15:
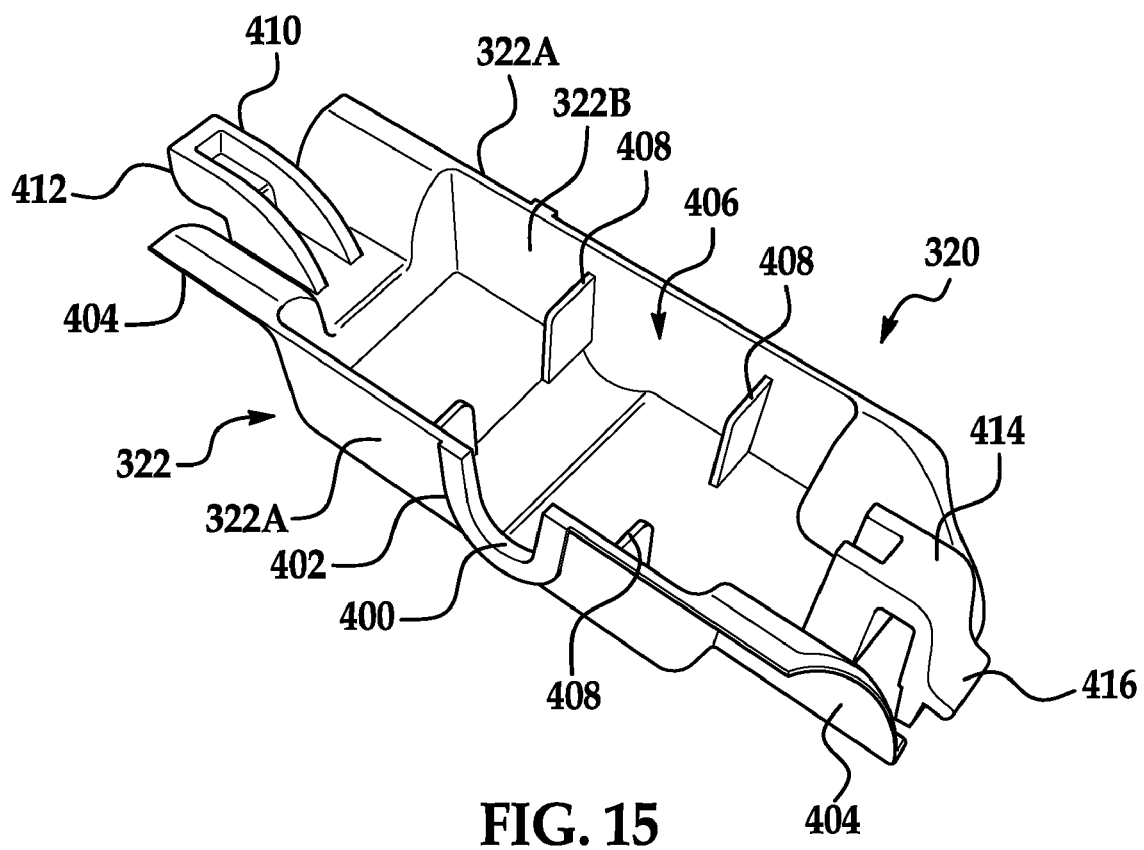
FIG. 15 is a bottom perspective view of the embodiment of the coupler assembly illustrated in FIG. 13 in accordance with the present invention.

The coupler 320 further includes a platform, generally indicated at 358. The platform 358 is disposed between the sidewalls 322. With specific reference to FIG. 15, the platform and sidewalls cooperate to define a housing, generally indicated at 406, that operatively receives the saddle 88 of the carrier 66. The housing 406 includes at least one stand-off 408 that is adapted to provide an interference-fit relative to the saddle 88. As shown in FIG. 15, the housing 406 includes four stand-offs 408. However, those having ordinary skill in the art will appreciate that the housing 406 may include any number of stand-offs 408 to accomplish the intended objective of providing an interference-fit between the coupler 320 and the saddle 88.

The coupler 322 further includes a tab 410 that depends from the platform 358 and extends outwardly therefrom. The tab 410 is adapted to be received through the access to engage a portion of the track 72 adjacent to the low-profile 74 end of the carrier 66. The tab 410 includes a bulbous end 412 that is adapted to provide a friction-fit relative to the engagement with the track 72. The coupler 320 further includes a locking tang 414 that depends from the platform 358 along the opposite side of the platform 358 relative to the tab 410. The locking tang 414 engages the gullet 98 adjacent to the high profile end of the carrier 76. To this end, the locking tang 414 includes a lip 416 that engages the track 72 below the arcuate top surface 78 of the carrier 66. The lip 416 of the locking tang 414 and the tab 410 cooperate to lock the coupler 320 into attachment with the carrier 66. Furthermore, these components cooperate to prevent axial movement between the coupler 320 and carrier 66. It should be appreciated by those having ordinary skill in the art that the locking tang 414 may be actuated by an end user to release the connection between the coupler 320 and the carrier 66.

The platform 358 further includes a recessed section 418 that is operatively disposed adjacent to the tab 410. The recessed section 418 includes assembly indicia 420 that cooperates with the alignment member 86 of the carrier 66 to facilitate proper assembly of the coupler 320 to the carrier 66. More specifically, to assembly the coupler 320 to the carrier 66, the end user will orient the assembly indicia 420 and the alignment member 86 in reasonable proximity to each other and subsequently insert the tab 410 into the access 94 of the carrier 66. Thereafter, the end user will rotate the coupler 320 and/or carrier 66 in a manner such that the bulbous end 412 of the tab 410 will engage the track 72. Finally, the end user will continue with the rotating movement until the lip 416 of the locking tang 414 "clicks" into engagement with the track 72 below the arcuate top surface 78.

The platform 358 further includes a rest 422 that is adapted to receive a portion of the bent tab 73 of the wiper arm attachment member 34C. Specifically, when the wiper blade assembly 26 is connected to the wiper arm 24, the bent tab 73 straddles the coupler 320 across the rest 422 and along the sidewall 322, while the body 28 of the wiper arm 24 is juxtaposed adjacent the other sidewall 322. The platform 358 further includes at least one ridge 424 that defines one edge 426 of the rest 422. The ridge 424 serves to restrict lateral movement of the portion of the wiper arm attachment member 34C received by the rest 422.

The platform 358 further includes a deck 428 that extends parallel to the rest 422 to limit the range of movement of the wiper arm attachment member 34C during connection to the wiper blade assembly 26. To install the wiper blade assembly 26 to the wiper arm 24, the wiper blade assembly 26 is initially positioned in a substantially perpendicular manner relative to the wiper arm attachment member 34C (FIG. 16). The deck 428 provides the maximum position in which the wiper assembly 26 may be placed relative to the bent tab 73 in order to properly connect the wiper assembly 26 to the wiper arm attachment member 34C. With the wiper arm 24 in the correct position relative to the wiper blade assembly 26, as governed by the deck 428, the transversely extending pin 71 may be inserted through the notch 400 and into the port 108. The wiper blade assembly 26 is then rotated about the transversely extending pin 71 until the bent tab 73 is received by the rest 422.

When correctly installed, the wiper blade assembly 26 is oriented parallel to the wiper arm 24, with a portion of the bent tab 73 straddled over the rest 422 and one sidewall 322 and a portion of the wiper arm body 28 aligned substantially parallel and adjacent to the opposite sidewall 322 (FIG. 17). The raised surfaces 402 of the sidewalls 322 may also serve to provide an additional amount of friction between the coupler 320 and the wiper arm attachment member 34C to maintain the connection between same in the installed position even when the wiper element 36 is not in contact with the windshield 20. Further, during replacement of the wiper blade assembly 26, the deck 428 may also serve as a stop, indicating the proper amount of rotational travel of the wiper blade assembly 26 relative to the wiper arm attachment member 34C to provide sufficient clearance for removing the wiper blade assembly 26 from the wiper arm attachment member 34C.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A wiper blade system for use in connection with a wiper arm having an attachment member including as track defined by a base and rails depending therefrom, a bent tab extending outwardly from the base and guides that extend linearly downward from the rails, said wiper blade system comprising:
   a wiper blade assembly including a wiping element that contacts a surface to be wiped, at contacts least one elongated beam having longitudinal ends that define a predetermined length, a carrier that is operatively engaged to said elongated beam between said longitudinal ends, and an airfoil that is operatively disposed adjacent to said carrier and adapted to operatively connect said elongated beam and said wiping element;
   a coupler that is removably engaged to said carrier and adapted to releasably attach said wiper blade assembly to a wiper arm attachment member, said coupler including a pair of sidewalls each having a flange adapted to engage a portion of the guides of a wiper arm attachment member, said coupler further including an elevated platform and a deck each disposed between said sidewalls, said deck cooperating with a portion of said sidewalls to define a rest adapted to operatively receive the track of a wiper arm attachment member; and
   said coupler further including an engaging member that is adapted to receive a portion of the bent tab of a wiper arm attachment member to facilitate releasable attachment between said wiper assembly and a wiper arm attachment member.

2. The wiper blade system as set forth in claim 1 wherein said couple further includes a nose disposed between said sidewalls, said engaging member having a cantilevered body that depends from said nose and a bulbous head operatively disposed at the terminal end of said cantilevered body, said engaging member further including a ridge depending from said bulbous head and adapted to operatively engage a portion of the bent tab of a wiper arm attachment member.

3. The wiper blade system as set forth in claim 1 wherein said deck further includes a cantilevered beam having a raised portion adapted to provide an interface fit between said coupler and the track of a wiper arm attachment member.

4. The wiper blade system as set forth in claim 3 wherein said deck further includes a bridge disposed between said cantilevered beam and said elevated platform, said bridge adapted to provide a positive stop between a portion the bent tab of a wiper arm attachment member when said coupler is releasably attached to a wiper arm attachment member.

5. The wiper blade system as set forth in claim 1 wherein each of said sidewalls farther include an opposed surface having a recessed section that cooperates with said deck to define said rest, said recessed sections partially defined by a lip disposed on said opposed surfaces, said lips adapted to provide a positive stop relative to the rails of a wiper arm attachment member.

6. The wiper blade system as set forth in claim 1 wherein each of said flanges include a terminal edge and a barb disposed adjacent to the terminal edge, said barbs adapted to operatively engage a portion of the guides of a wiper arm attachment member, said barbs adapted to actuate movement of said flanges to facilitate releasable attachment between said wiper couplet and a wiper arm attachment member.

* * * * *

UNITED STATES PATENT AND TRADEMARK OFFICE
CERTIFICATE OF CORRECTION

| | | |
|---|---|---|
| PATENT NO. | : 8,397,341 B2 | Page 1 of 1 |
| APPLICATION NO. | : 12/779290 | |
| DATED | : March 19, 2013 | |
| INVENTOR(S) | : Dan Ehde | |

It is certified that error appears in the above-identified patent and that said Letters Patent is hereby corrected as shown below:

In the Claims:

Column 13, line 39 delete "contacts" between "at" and "least".

Column 14, line 45 delete "couplet" and insert therefor -- coupler --.

Signed and Sealed this
Fourteenth Day of May, 2013

Teresa Stanek Rea
*Acting Director of the United States Patent and Trademark Office*